(12) United States Patent
Talalai

(10) Patent No.: US 6,898,272 B2
(45) Date of Patent: May 24, 2005

(54) SYSTEM AND METHOD FOR TESTING TELECOMMUNICATION DEVICES

(75) Inventor: Alexander Talalai, Palo Alto, CA (US)

(73) Assignee: Spirent Communications, Rockville, MD (US)

(*) Notice: Subject to any disclaimer, the term of this patent is extended or adjusted under 35 U.S.C. 154(b) by 0 days.

(21) Appl. No.: 10/211,715

(22) Filed: Aug. 1, 2002

(65) Prior Publication Data

US 2004/0022367 A1 Feb. 5, 2004

(51) Int. Cl.⁷ .......................... H04M 1/24; H04M 3/08; H04M 3/22
(52) U.S. Cl. ................. 379/10.03; 379/22.01; 379/22.02; 379/29.01; 379/28; 375/224; 375/242
(58) Field of Search ............... 379/1.01, 1.02, 379/9.06, 10.01, 10.03, 15.01, 22.02, 26.01, 29.01, 29.02, 31; 375/220, 221, 222, 224, 225, 242; 714/715, 716

(56) References Cited

U.S. PATENT DOCUMENTS

| | | | | |
|---|---|---|---|---|
| 5,535,299 A | * | 7/1996 | Riedel | 704/212 |
| 5,572,570 A | * | 11/1996 | Kuenzig | 379/1.02 |
| 5,633,909 A | * | 5/1997 | Fitch | 379/29.01 |
| 5,907,827 A | * | 5/1999 | Fang et al. | 704/503 |
| 5,933,475 A | * | 8/1999 | Coleman | 379/10.01 |
| 5,940,472 A | * | 8/1999 | Newman et al. | 379/10.02 |
| 6,189,127 B1 | * | 2/2001 | Fang et al. | 714/799 |
| 6,304,634 B1 | * | 10/2001 | Hollier et al. | 379/22.02 |
| 6,308,065 B1 | * | 10/2001 | Molinari et al. | 455/424 |
| 6,411,623 B1 | * | 6/2002 | DeGollado et al. | 370/395.1 |
| 6,574,280 B1 | * | 6/2003 | Liau et al. | 375/242 |
| 2003/0068982 A1 | * | 4/2003 | Barrett et al. | 455/67.1 |
| 2004/0190494 A1 | * | 9/2004 | Bauer | 370/352 |
| 2004/0193974 A1 | * | 9/2004 | Quan et al. | 714/724 |

* cited by examiner

*Primary Examiner*—Binh Tieu
(74) *Attorney, Agent, or Firm*—Martine Penilla & Gencarella, LLP

(57) ABSTRACT

An invention is provided for testing telecommunications devices. Broadly speaking, test data is encoded prior to testing a SUT. Then, during testing, the encoded test data is transmitted to the SUT, which processes the test data. The processed test data then is received back from the SUT. The processed test data is decoded in real-time, as opposed to the encoding of the test data, which is performed offline and prior to testing. In addition, a quality of the processed test data is analyzed. Typically, the test data is speech data, which is stored prior to testing the SUT. Optionally, the speech data can be encoded offline using a computer system separate from the testing system.

21 Claims, 7 Drawing Sheets

SYSTEM AND METHOD FOR TESTING TELECOMMUNICATION DEVICES

BACKGROUND OF THE INVENTION

1. Field of the Invention

This invention relates generally to telecommunication, and more particularly to high density telecommunication testing.

2. Description of the Related Art

Today, modern telecommunications systems often perform complex operations, such as data compression, when transmitting signals through the telecommunications network. These operations generally have non-linear effects on the signal inputs. As a result, it is often not possible to model the effects of the network by simulating the additive affect of each component of the network. In particular, the affect of the network on speech is not easily derivable from studying the network's affect on a simple test signal such as a sine wave.

Hence, voice communication signals generally are tested using voice generation and analyzing equipment in the form of a telecommunication testing system. FIG. 1 is a block diagram showing an exemplary conventional telecommunication testing configuration 100. As shown in FIG. 1, the telecommunication testing configuration 100 includes a system under test (SUT) 102, such as a telecommunication system, in communication with a test system 104. As mentioned above, one technique for testing the SUT 102 for voice QoS is call generation.

Call Generation is a testing mode in which the test system 104 creates telephone traffic by executing compiled call sequences (scripts). To test the SUT 102, the test system 104 provides a maximal load on the SUT 102. In particular, the test system 104 places data on the input channels of the SUT 102, and receives and analyzes the output data quality of the SUT 102 in real time.

In order to reduce the amount of data passing through the communication lines, the data is compressed before transmitting and decompressed after receiving using speech codecs, often referred to as vocoders. As shown in FIG. 1, the SUT 102 includes a codec 106a, and the test system 104 includes a similar codec 106b. In this manner, the test system 104 can encode speech data using the codec 106b. The test system 104 then transmits the encoded speech data to the SUT 102, which decodes the speech data using the codec 106a of the SUT 102. Similarly, the SUT 102 encodes speech data using the codec 106a and transmits the encoded speech data to the test system 104. The test system then decodes the speech data using the codec 106b of the test system 104.

FIG. 2 shows an exemplary conventional speech codec 106 for encoding and decoding speech data. The speech codec 200 is a hardware circuit (chip) or software/firmware routine that converts the spoken word into digital code and vice versa. In particular, a speech codec is an audio codec specialized for human voice. By analyzing vocal tract sounds, a recipe for rebuilding the sound at the other end is sent rather than the soundwaves themselves. As a result, the speech codec is able to achieve a much higher compression ratio than regular audio codecs, which yields a smaller amount of digital data for transmission.

As shown in FIG. 2, the speech codec 106 includes an encoder 200 and a decoder 202. The codec 106 both encodes and decodes speech data using the encoder 200 and the decoder 202 respectively. For example, in a SUT, the codec 106 can be used to transform data between Pulse Code Modulation (PCM) format and Adaptive Differential PCM (ADPCM) format.

PCM is a technique for converting analog signals into digital form that is widely used by the telephone companies in their T1 circuits. For example, telephone conversations, as well as data transmissions via modem, are converted into digital via PCM for transport over high-speed intercity trunks. In North America and Japan, PCM samples the analog waves 8,000 times per second and converts each sample into an 8-bit number, resulting in a 64 Kbps data stream (a single DS0 channel). The sampling rate is twice the 4 kHz bandwidth required for a toll-quality conversation. ADPCM is an advanced PCM technique that converts analog sound into digital data and vice versa. Instead of coding an absolute measurement at each sample point, it codes the difference between samples and can dynamically switch the coding scale to compensate for variations in amplitude and frequency.

Thus, for example, the decoder 202 section of the codec 106 can receive a PCM signal from the telecommunications network. Once received, the decoder 202 can decode the PCM signal and provide the uncompressed speech data to the telecommunications system, which processes the signal. Thereafter, the telecommunications system uses the encoder 200 to encode the uncompressed data into, for example, an ADPCM signal and transmits. In this manner, the codec 106 allows a system to receive and process PCM data and transmit ADPCM data. To test such a system, the test system can include an encoder that encodes PCM data and a decoder that decodes ADPCM data.

For example, referring back to FIG. 1, when testing the SUT 102, the test system 104 encodes speech data using the codec 106b. For example, the codec can encode uncompressed speech test data into PCM format. The test system then transmits the encoded PCM data to the SUT 102, which uses the codec 106a to decode the PCM data for processing. The SUT 102 can then encode the speech data into, for example, ADPCM format and transmit the encoded data back to the test system 104. The test system then decodes the ADPCM speech data using the codec 106b and analyses the speech data for quality.

Unfortunately, test systems 104 using call generation typically cannot support a large amount of data channels without distorting the performance of the SUT 102. For example, if the SUT 102 can support, for example, 300 simultaneous data channels, a typical testing system 104 can only support, for example, about 100 simultaneous data channels. As a result, three testing systems 104 would be needed to test the performance of the SUT 102.

In view of the foregoing, there is a need for systems and methods for high density telecommunication testing. The systems and methods should be capable of performing quality of service (QoS) testing on the SUT, and further, should support an increased number of simultaneous data channels without distorting the performance of the SUT.

SUMMARY OF THE INVENTION

Embodiments of the present invention fills these needs by providing a telecommunications testing system that supports an increased number of simultaneous data channels. To this end, embodiments of the present invention separate the encoder and decoder of the testing system codec, which allows offline encoding of test data, which greatly increases the density support of the testing system. In one embodiment, a method is disclosed for testing telecommunications devices. Broadly speaking, test data is encoded prior to testing a SUT. Then, during testing, the encoded test data is transmitted to the SUT, which processes the test data. The processed test data then is received back from the SUT. The processed test data is decoded in real-time, as opposed to the encoding of the test data, which is performed offline and prior to testing. In addition, a quality of the processed test data is analyzed. Typically, the test data is speech data, which is stored prior to testing the SUT. Optionally, the speech data can be encoded offline using a computer system separate from the testing system.

In an additional embodiment, a system for testing telecommunication devices is disclosed. The system includes an encoder that encodes test data prior to testing a SUT, and a decoder that decodes processed test data received from the SUT in real-time during testing of the SUT. Optionally, the system can include memory that stores the encoded test data prior to testing the SUT. In this case, the stored encoded test data can be transmitted to the SUT during testing of the SUT, where the SUT processes the test data and transmits the processed test data to the system. Further, speech quality comparison logic can be included that analyzes the quality of the processed speech data. Optionally, the speech quality comparison logic can compare the processed speech data to reference speech data to obtain speech quality result data, which can be stored in a quality of service (QoS) data file.

A computer program embodied on a computer readable medium for testing telecommunication devices is disclosed in a further embodiment of the present invention. The computer program includes an encoder code segment that encodes test data prior to testing a SUT, and a decoder code segment that decodes processed test data received from the SUT in real-time during testing of the SUT. As above, the test data generally is speech data. Optionally, the computer program can include a code segment that stores the encoded speech data prior to testing the SUT, and a code segment that compares the processed test data to reference speech data to obtain speech quality result data. Similar to above, the computer program can further include a code segment that stores the speech quality result data to a QoS data file.

Advantageously, by separating the encoding functions from the decoding functions, embodiments of the present invention require approximately half the resources required by conventional test systems, which utilize codecs to perform SUT testing. As a result, embodiments of the present invention can increase by approximately two times the number of data channels that the test system can support. Thus, embodiments of the present invention can support twice the data channels that can be supported using conventional telecommunication testing systems. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for a telecommunications testing system that supports an increased number of simultaneous data channels. Broadly speaking, embodiments of the present invention separate the encoder and decoder of the testing system codec, thus allowing offline encoding of testing data, which greatly increases the density support of the testing system. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
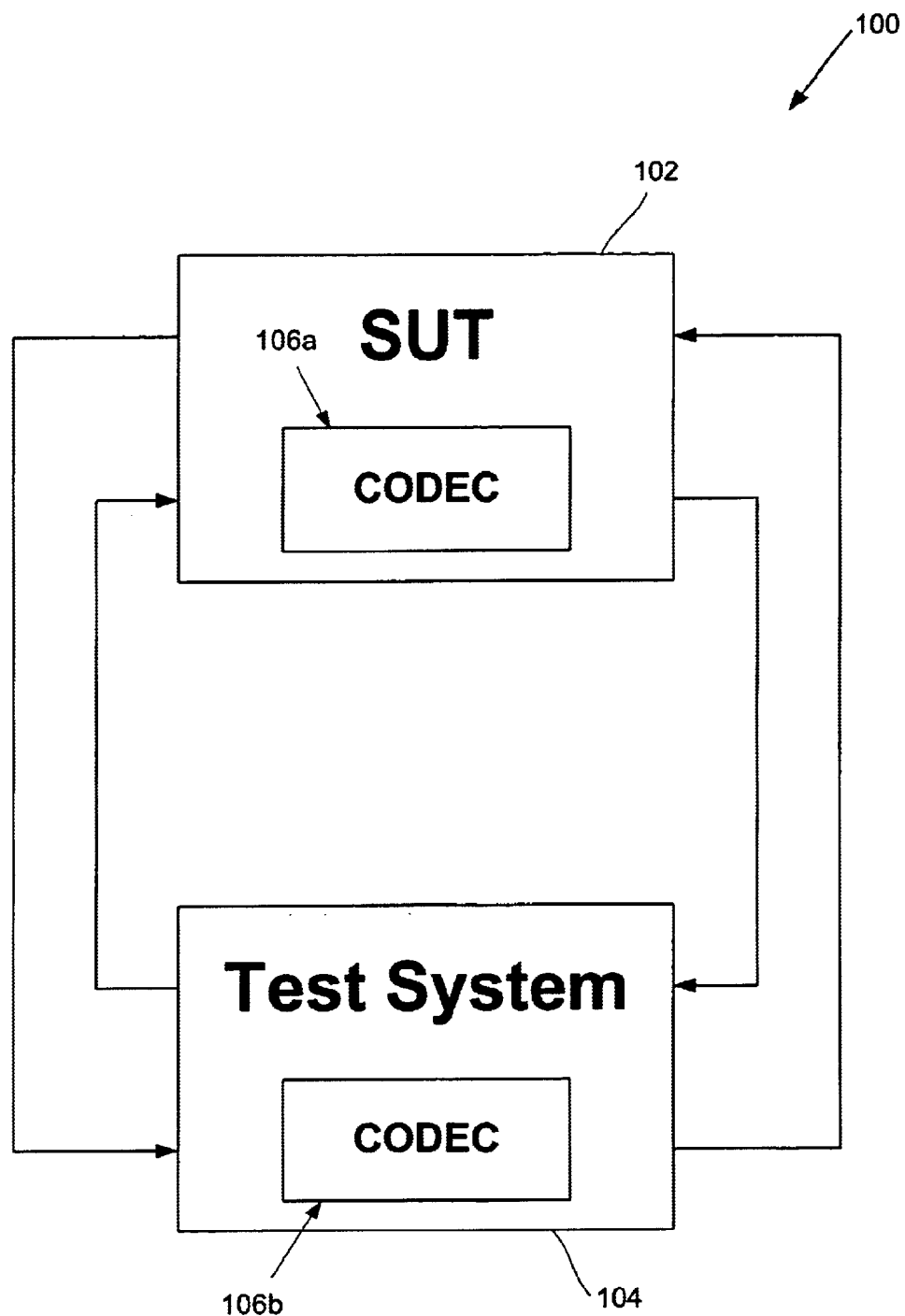
FIG. 1 is a block diagram showing an exemplary conventional telecommunication testing configuration.
Figure 2:
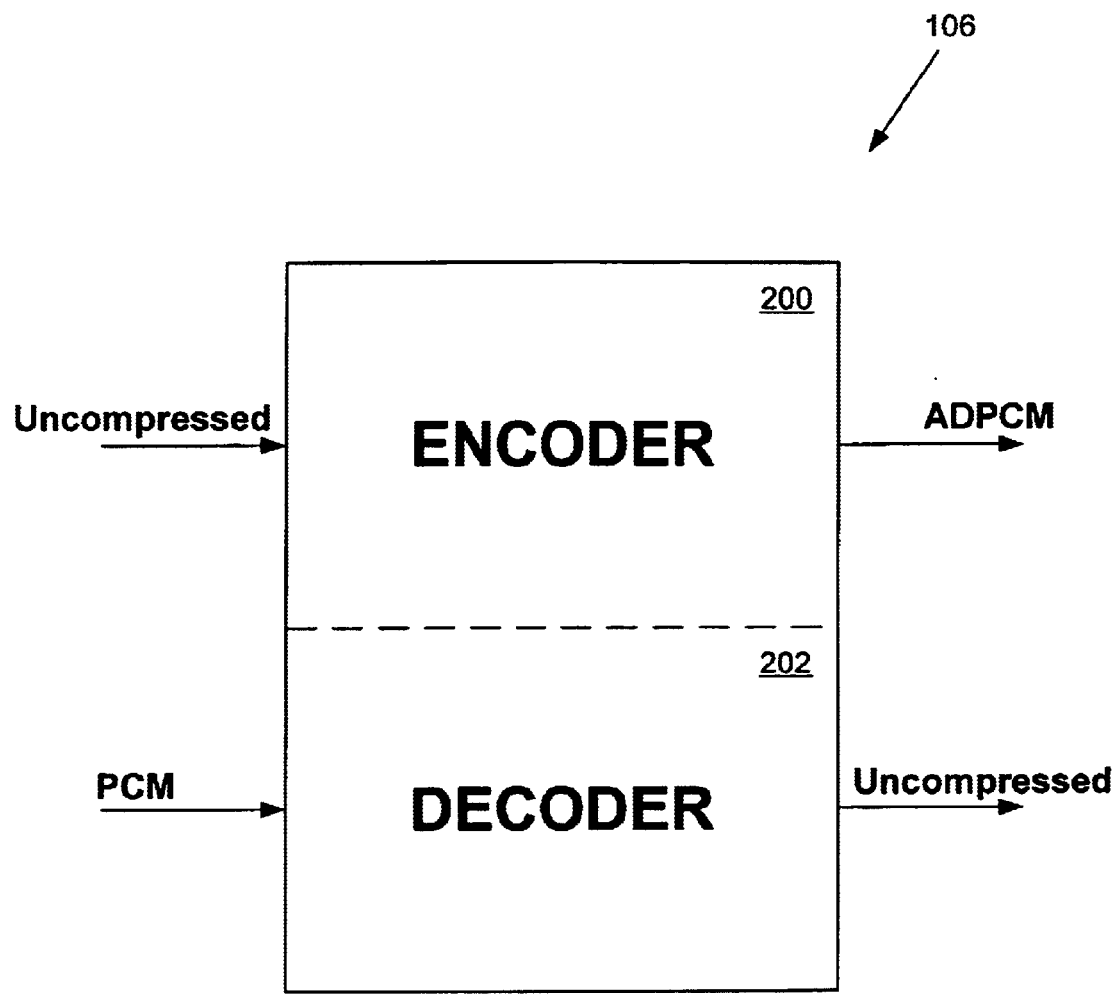
FIG. 2 shows an exemplary conventional speech codec for encoding and decoding speech data.
Figure 3A:
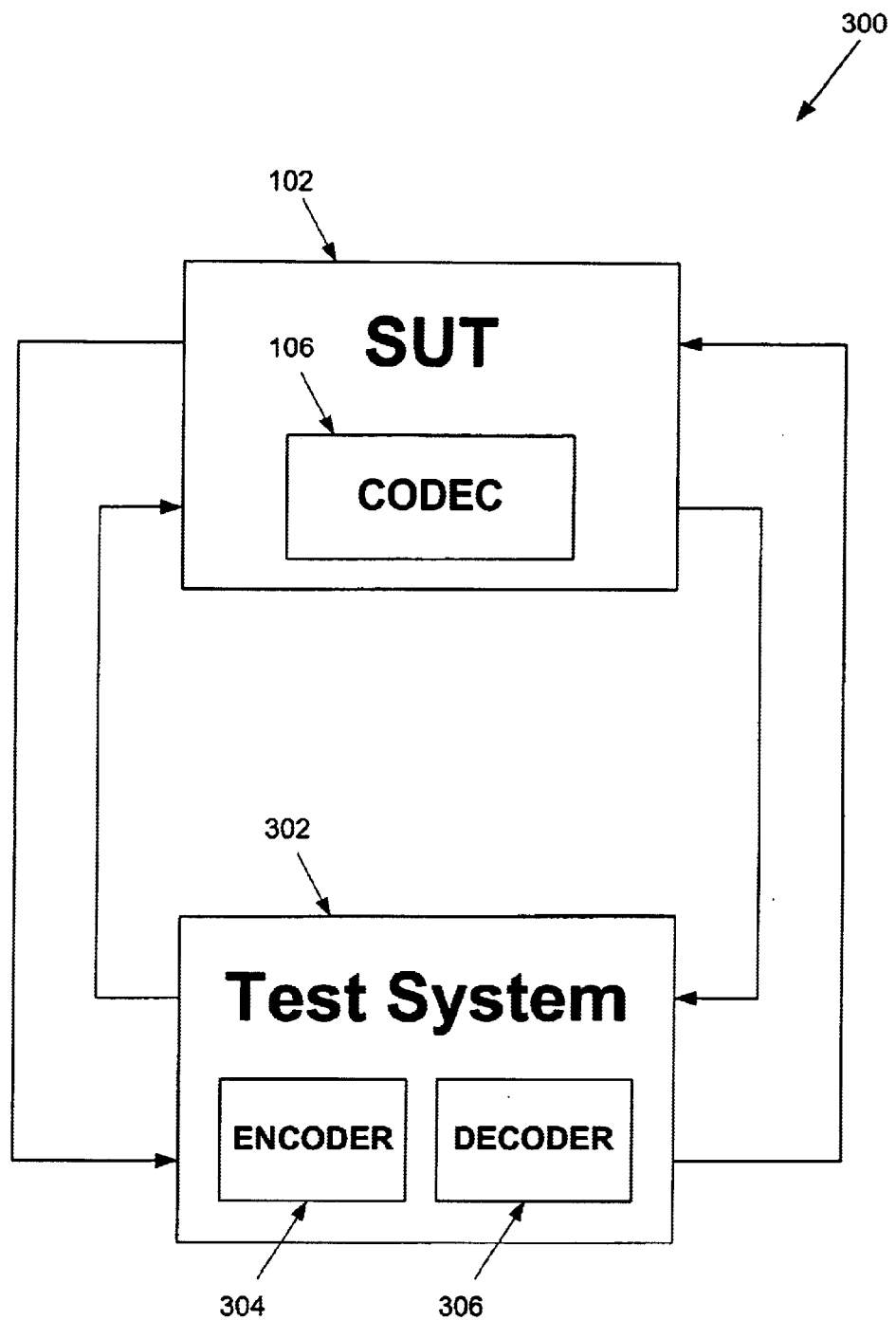
FIG. 3A is a block diagram showing an exemplary telecommunication testing configuration, in accordance with an embodiment of the present invention.

FIG. 3A is a block diagram showing an exemplary telecommunication testing configuration 300, in accordance with an embodiment of the present invention. The telecommunication testing configuration 300 includes a testing system 302 in communication with a SUT 102, which includes, as discussed above, a codec 106 that provides encoding and decoding of speech data.

In place of a conventional codec, the test system 302 includes an encoder 304 and a decoder 306, which operate independent of each other. Broadly speaking, the encoder 304 encodes test data prior to testing the SUT 102. Then, during testing of the SUT, the decoder 306 decodes, in real-time, processed test data received from the SUT.

More particularly, prior to testing the SUT 102, test data is provided to the encoder 304. As mentioned above, one technique for testing the SUT 102 for voice QoS is call generation, which is a testing mode in which the test system 302 creates telephone traffic by executing compiled call sequences. To test the SUT 102, the test system 302 places data on the input channels of the SUT 102, and receives and analyzes the output data quality of the SUT 102 in real-time.

As mentioned above, the test data is compressed before transmitting and decompressed after being received in order to reduce the amount of data passing through the communication lines. Generally, the task of encoding data is much more computationally expensive than the task of decoding data. For example, in most cases a decoder can execute five to ten times faster than an encoder. Moreover, a decoder generally utilizes less memory for program body and data. Furthermore, an encoding task can utilize more resources than a decoding task and quality evaluation task together.

Hence, embodiments of the present invention separate the task of encoding the test data from the task of decoding the test data. In particular, the encoding is performed offline, prior to testing the SUT, when encoder processing time is not an issue. For example, reference test data, such as speech data is provided to the encoder 304, which encodes the test data. The encoded test data is then stored for future testing. As will be appreciated, the encoder 304 can perform encoding operations at any time prior to testing the SUT. For example, the encoder 304 can encode the test data hours or days before actual testing of the SUT 102. Once the test data is encoded, the encoder 304 generally is no longer utilized during testing of the SUT 102.

Specifically, during actual testing of the SUT 102, the stored test data is transmitted to the SUT 102. Because the test data has been previously encoded prior to testing the SUT 102, the encoder 304 is not required to perform any encoding operations during testing of the SUT 102. As a result, embodiments of the present invention perform decoding operations, which are five to ten times faster than encoding operations, during testing of the SUT 102 without requiring encoding operations.

Thus, the test system 302 transmits the encoded speech data to the SUT 102, which decodes the speech data using the codec 106 and processes the decoded speech data. The SUT 102 then encodes the processed speech data using the codec 106 and transmits the encoded speech data to the test system 302. The test system then decodes the speech data using the decoder 306 of the test system 302. Thereafter, the test system 302 analyzes the speech data.

In one embodiment, as will be described in greater detail below, the test system 302 includes speech quality comparison logic that analyzes the quality of the processed speech data. The speech quality comparison logic compares the processed speech data to reference speech data to obtain speech quality result data, which then can be stored in a quality of service (QoS) data file for later use.

Figure 3B:
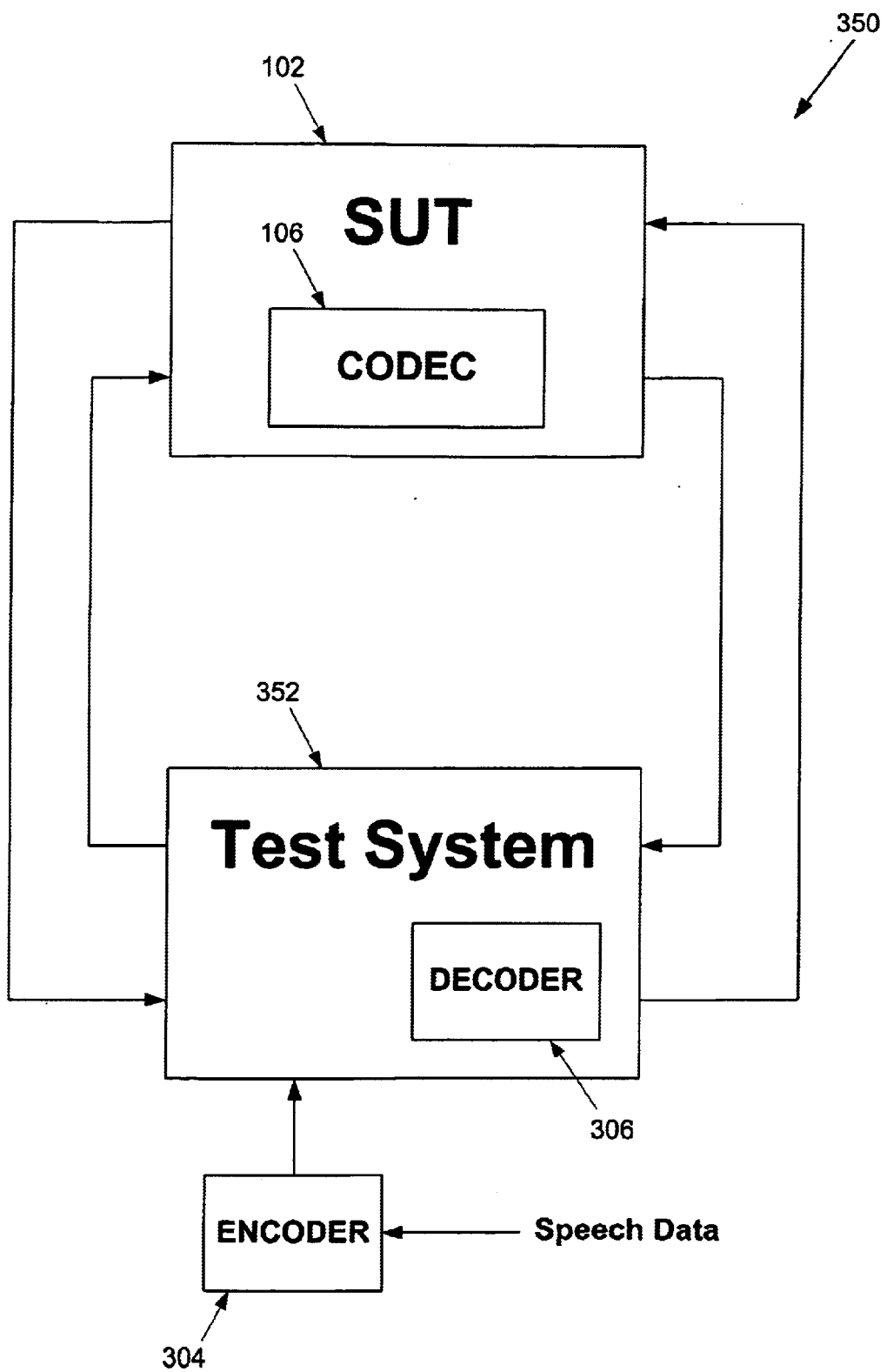
FIG. 3B is a block diagram showing an exemplary telecommunication testing configuration having a separated encoder, in accordance with an embodiment of the present invention.

Since the encoder 304 and decoder 306 are separate, embodiments of the present invention can execute the encoder 304 on a separate computer system than that executing the decoder 306, as shown in FIG. 3B. FIG. 3B is a block diagram showing an exemplary telecommunication testing configuration 350 having a separated encoder 304, in accordance with an embodiment of the present invention. The telecommunication testing configuration 350 includes a testing system 352 in communication with a SUT 102, which includes, as discussed above, a codec 106 that provides encoding and decoding of speech data.

As shown in FIG. 3B, the encoder 304 can be separated from the test system 352 to provide additional flexibility in offline encoding of the speech test data. For example, the encoder 304 can be executed on a general purpose personal computer, which can be located separately from the test system 352. Moreover, as mentioned above, the encoder 304 can be used to encode the test data anytime prior to conducting the test on the SUT 102. For example, the encoder 304 can be executed days before actual SUT testing using a personal computer located at a separate location. Further, the encoded speech data can be stored as one or more data files, which can be later transferred to the test system 352 using, for example, removable storage such as floppy disks, CD-Rs, CD-RWs, and/or DVDs. Optionally, the encoded speech data can be transmitted to the test system 352 using a network, such as a local area network (LAN) and/or a wide area network (WAN), such as the Internet.

Similar to FIG. 3A, in the embodiment of FIG. 3B the stored test data is transmitted to the SUT 102 during actual testing of the SUT 102. Because the test data has been previously encoded prior to testing the SUT 102, the encoder 304 is not required to perform any encoding operations during testing of the SUT 102. As a result, embodiments of the present invention perform decoding operations, which are five to ten times faster than encoding operations, during testing of the SUT 102 without requiring encoding operations.

Thus, once the test system 352 receives the encoded speech data, the test system 352 transmits the encoded speech data to the SUT 102, which decodes the speech data using the codec 106 and processes the decoded speech data. The SUT 102 then encodes the processed speech data using the codec 106 and transmits the encoded speech data to the test system 352. The test system then decodes the speech data using the decoder 306 of the test system 352. Thereafter, the test system 352 analyzes the speech data.

Advantageously, by separating the encoding functions from the decoding functions, as described above with reference to FIGS. 3A and 3B, embodiments of the present invention require approximately half the resources required by conventional test systems, which utilize codecs to perform SUT testing. As a result, embodiments of the present invention can increase by approximately two times the number of data channels that the test system can support. Thus, embodiments of the present invention can support twice the data channels that can be supported using conventional telecommunication testing systems.

Figure 4:
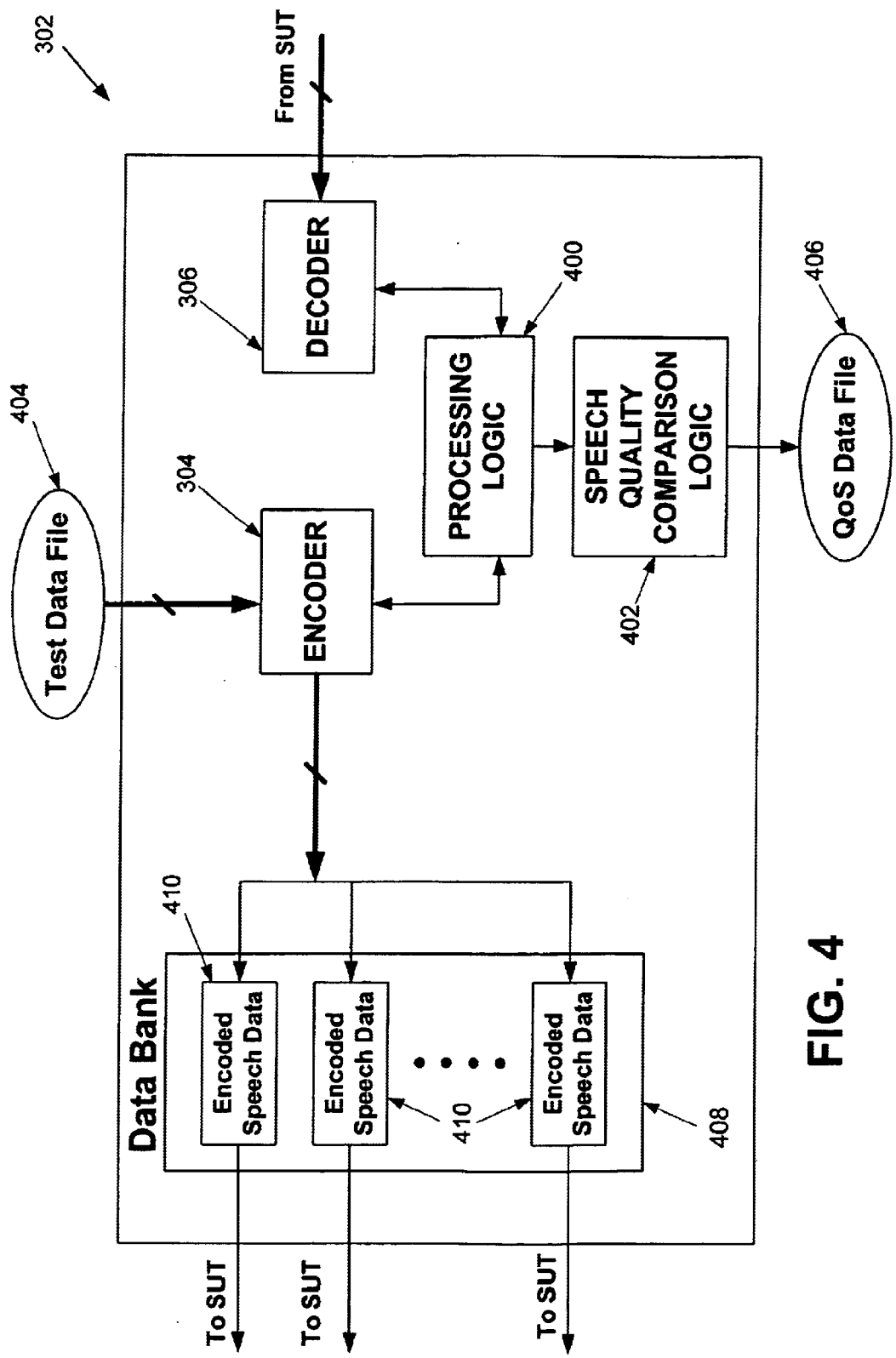
FIG. 4 is a block diagram showing a telecommunication test system, in accordance with an embodiment of the present invention.

FIG. 4 is a block diagram showing a telecommunication test system 302, in accordance with an embodiment of the present invention. The test system 302 includes an encoder 304 and a decoder 306. In communication with both the encoder 304 and the decoder 306 is processing logic 400 that coordinates the processing flow of the various system components. Further, speech quality comparison logic 402 is included that determines the QoS of the SUT. Coupled to the encoder 304 is a data bank 408, which is used to store the encoded speech data 410.

As mentioned above, embodiments of the present invention preprocess the test data prior to testing the SUT. In one embodiment, the encoder 304 receives a test data file 404, which includes speech data that will be utilized as test data for the SUT. For example, the speech data can comprise a plurality of spoken sentences specifically selected to test various aspects of the SUT. To reduce the amount of data transmitted on the data channels, the speech data from the test data file 404 is compressed using the encoder 304, which encodes the speech data into a format the SUT will expect to receive. The encoded speech data 410 then is stored in the data bank 408 for later use during testing of the SUT. As mentioned previously, the encoder 304 can perform encoding operations at any time prior to testing the SUT. For example, the encoder 304 can encode the test data hours or days before actual testing of the SUT. Once the test data is encoded, the encoder 304 generally is no longer utilized during testing of the SUT.

During actual testing of the SUT, the stored encoded speech data 410 is transmitted to the SUT. Because the speech data has been previously encoded prior to testing the SUT, the encoder 304 is not required to perform any encoding operations during SUT testing. As a result, embodiments of the present invention, without requiring encoding operations, are free to perform decoding operations, which are five to ten times faster than encoding operations, during testing of the SUT.

Thus, the test system 302 transmits the encoded speech data 410 to the SUT, which decodes and processes the decoded speech data. The SUT then encodes the processed speech data using a codec and transmits the encoded speech data to the test system 302. The test system then decodes the speech data using the decoder 306 of the test system 302. The test system 302 can then analyze the speech data using the speech quality comparison logic 402.

The speech quality comparison logic compares the processed speech data to reference speech data, such as the test data file 404, to obtain speech quality result data, which can then be is stored in a QoS data file 406 for later use. The QoS data file 406 can be stored, for example, on mass storage and/or removable storage such as floppy disks, CD-Rs, CD-RWs, and/or DVDs. Optionally, the QoS data file 406 can be transmitted to other computer systems using a network, such as a local area network (LAN) and/or a wide area network (WAN), such as the Internet.

As discussed above, embodiments of the present invention advantageously require approximately half the resources required by conventional test systems, which utilize codecs to perform SUT testing. As a result, embodiments of the present invention can support twice the data channels that can be supported using conventional telecommunication testing systems.

As will be appreciated, a test system of the embodiments of the present invention can originate and terminate a call through a switch or similar telecommunication device. Moreover, the circuit type of the originating channel can be the same as or different from that of the terminating channel. That is, the encoder 304 can encode the speech data into one particular format, such as PCM, and the decoder 306 can be designed to receive and decode data encoded in a different format, such as ADPCM. As such, embodiments of the present invention can be utilized to create multiple telephone calls, answer calls, confirm that calls are correctly established, create and respond to unique tones, measure and display call statistics in real time, and generate calls on one circuit type and terminate calls on another circuit type.

Figure 5:
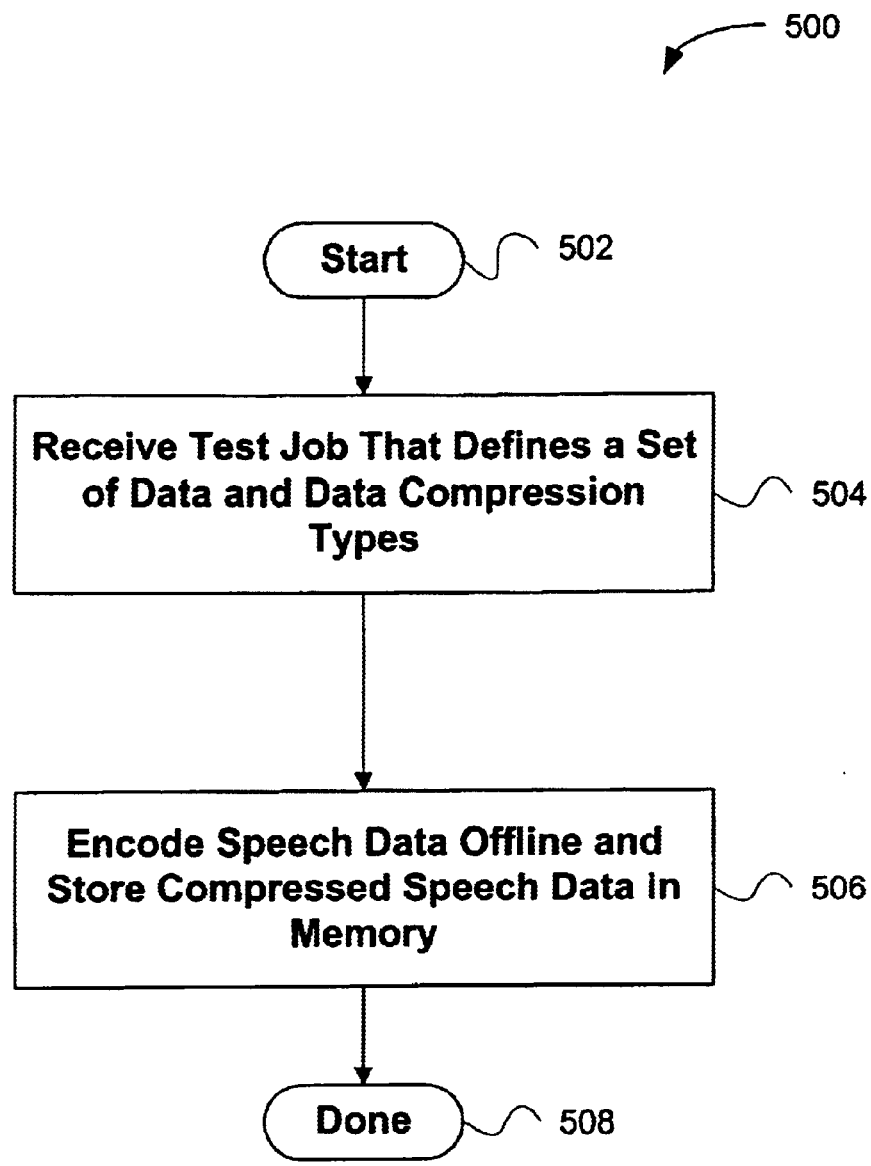
FIG. 5 is a flowchart showing a method for preprocessing test data for testing telecommunications devices, in accordance with an embodiment of the present invention.

FIG. 5 is a flowchart showing a method 500 for preprocessing test data for testing telecommunications devices, in accordance with an embodiment of the present invention. As discussed above, embodiments of the present invention separate the encoder and decoder of the testing system codec. This allows offline encoding of testing data, which greatly increases the density support of the testing system. In an initial operation 502, preprocess operations are performed. Preprocess operations can include, for example, defining a test job, provisioning the test system into the system having the SUT, and other preprocess operations that will be appreciated with those skilled in the art after a careful reading of the present disclosure.

In operation 504, a test job is received that defines a set of data and data compression types. Generally, embodiments of the present invention utilize call generation to test the SUT. As such, the test job defines the set of speech data that will be encoded and sent to the SUT and later analyzed for QoS. In addition to the speech data, the data compression types that will be utilized during the test are defined in the test job. The data compression types can vary from input to output as mentioned above with reference to FIG. 4. For example, a particular SUT may expect data encoded as PCM as an input and may encode speech data in ADPCM format at the output.

The speech data is then encoded offline and stored in memory prior to testing the SUT, in operation 506. As mentioned above with reference to FIG. 3B, the encoder can be separated from the test system to provide additional flexibility in offline encoding of the speech test data. For example, the encoder can be executed on a general purpose personal computer, which can be located separately from the test system. Moreover, as mentioned above, the encoder can be used to encode the test data anytime prior to conducting the test on the SUT. For example, the encoder can be executed days before actual SUT testing using a personal computer located at a separate location. Furthermore, the encoded speech data can be stored as one or more data files, which can be later transferred to the test system using, for example, removable storage such as floppy disks, CD-Rs, CD-RWs, and/or DVDs. Optionally, the encoded speech data can be transmitted to the test system using a network, such as a local area network (LAN) and/or a wide area network (WAN), such as the Internet.

Post process operations are performed in operation 508. Post process operations can included, for example, testing the SUT, analyzing test results, and other post process operations that will be apparent to those skilled in the art after a careful reading of the present disclosure. Because the speech data has been previously encoded prior to testing the SUT, the encoder is not required to perform any encoding operations during SUT testing. As a result, embodiments of the present invention, without requiring encoding operations, are free to perform decoding operations, which are five to ten times faster than encoding operations, during testing of the SUT.

Figure 6:
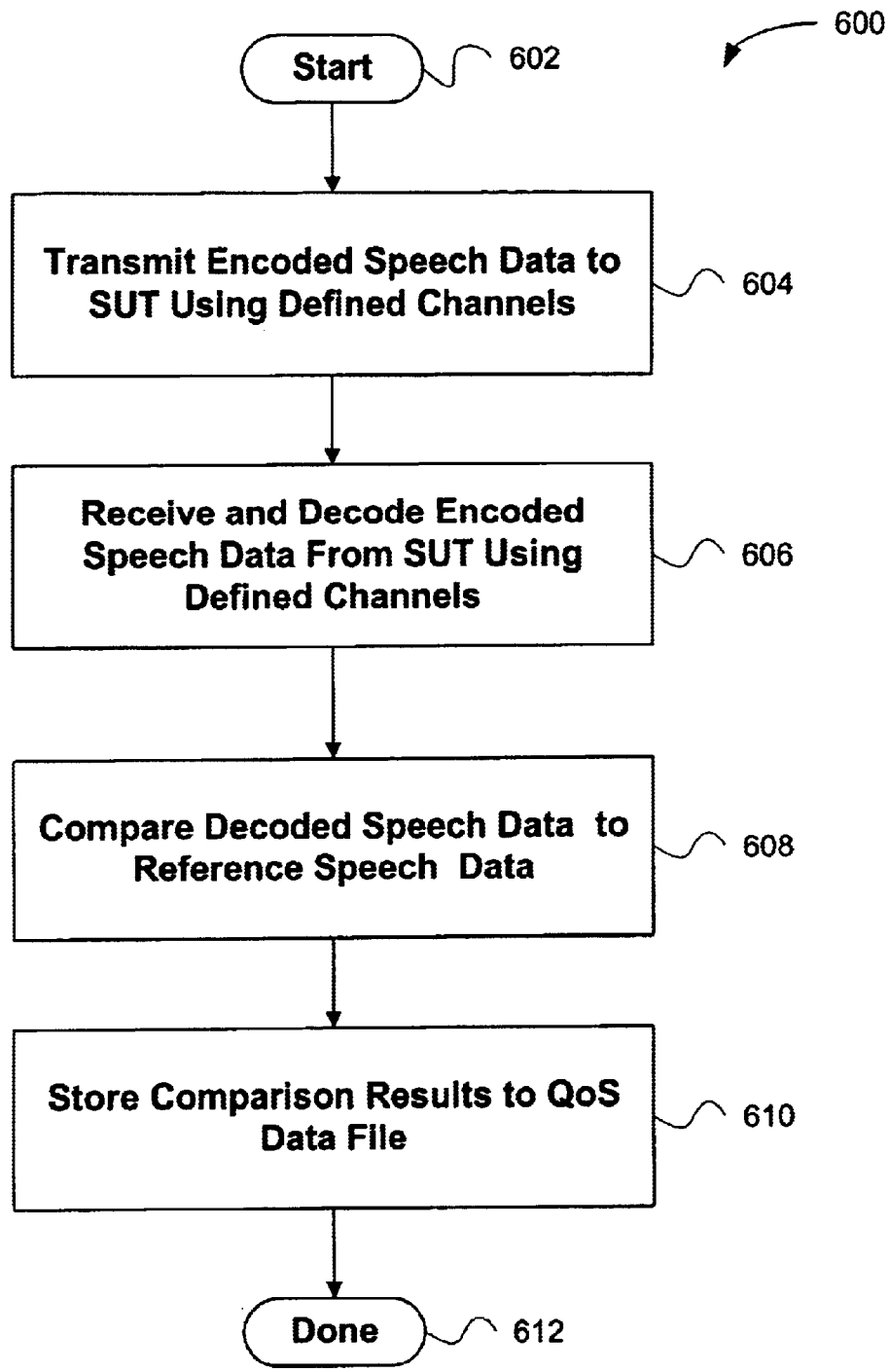
FIG. 6 is a flowchart showing a method for testing a telecommunication device, in accordance with an embodiment of the present invention.

FIG. 6 is a flowchart showing a method 600 for testing a telecommunication device, in accordance with an embodiment of the present invention. As discussed above, embodiments of the present invention preprocess and encode test data prior to testing the SUT. In this manner, computationally expensive encoding operations are not required during SUT testing, which enables embodiments of the present invention to use extra resources to facilitate decoding and analysis operations. As a result, increased channel density can be achieved using the embodiments of the present invention. In an initial operation 602, preprocess operations are performed. Preprocess operations include encoding the test data in a format the SUT will expect, storing the encoded data on the test system, and other preprocess operations that will be apparent to those skilled in the art after a careful reading of the present disclosure.

In operation 604, the compressed speech data is transmitted to the SUT using predefined data channels. During actual testing of the SUT, the stored speech data is transmitted to the SUT. Because the test data has been previously encoded prior to testing the SUT, the encoder is not required to perform any encoding operations during testing of the SUT. As a result, embodiments of the present invention perform decoding operations, which are five to ten times faster than encoding operations, during testing of the SUT without requiring encoding operations.

The encoded processed speech data is received from the SUT and decoded using the test system decoder, in operation 606. In response to receiving the encoded speech data from the test system, the SUT decodes the speech data using its codec and processes the decoded speech data. The SUT then uses the codec to encode the processed speech data and transmits the encoded speech data to the test system. Then, in operation 606, the test system receives and decodes the speech data using the decoder of the test system.

In operation 608, the decoded speech data is compared to reference speech data. The test system analyzes the QoS provided by the SUT by comparing the speech data received from the SUT to reference speech data. In one embodiment, the test system uses speech quality comparison logic to compare the processed speech data to reference speech data, such as from a test data file, to obtain speech quality result data.

The Comparison results are stored to a QoS data file in operation 610. The speech quality result data is stored in a QoS data file, which can be stored, for example, on mass storage and/or removable storage such as floppy disks, CD-Rs, CD-RWs, and/or DVDs. Optionally, the QoS data file can be transmitted to other computer systems using a network, such as a local area network (LAN) and/or a wide area network (WAN), such as the Internet.

Post process operations are performed in operation 612. Post process operations can include for example, analysis of the QoS data file, comparison of the QoS data file to prior QoS data files, and other post process operations that will be apparent to those skilled in the art after a careful reading of the present disclosure. As discussed above, by separating the encoding functions from the decoding functions, embodiments of the present invention require approximately half the resources required by conventional test systems, which utilize codecs to perform SUT testing. As a result, embodiments of the present invention advantageously can increase by approximately two times the number of data channels that the test system can support. Thus, embodiments of the present invention can support twice the data channels that can be supported using conventional telecommunication testing systems.

The invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. Examples of the computer readable medium include read-only memory, random-access memory, CD-ROMs, CD-Rs, CD-RWs, magnetic tapes, and other optical data storage devices. The computer readable medium can also be distributed over network coupled computer systems so that the computer readable code is stored and executed in a distributed fashion.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for testing telecommunications devices, comprising the operations of:
   encoding test data prior to testing a system under test (SUT);
   transmitting the encoded test data to the SUT, the SUT processing the test data;
   receiving the processed test data from the SUT;
   decoding the processed test data in real-time; and
   analyzing a quality of the processed test data,
   wherein the method operation of encoding the test data includes compressing the test data for transmission to the SUT.

2. A method as recited in claim 1, wherein the test data is speech data.

3. A method as recited in claim 2, further comprising the operation of storing the encoded speech data prior to testing the SUT.

4. A method as recited in claim 1, wherein a testing system is used to decode the processed test data.

5. A method as recited in claim 4, wherein the speech data is encoded offline using a computer system separate from the testing system.

6. A method as recited in claim 1, further comprising the operation of comparing the processed test data to reference speech data to obtain speech quality result data.

7. A method as recited in claim 6, further comprising the operation of storing the speech quality result data to a quality of service (QoS) data file.

8. The method of claim 1 wherein the compressing the test data is defined by one of a pulse code modulation (PCM) format and an adaptive differential PCM (ADPCM) format.

9. A system for testing telecommunication devices, comprising:
   an encoder that encodes test data prior to testing a system under test (SUT), the test data being compressed by the encoder for transmission to the SUT; and
   a decoder that decodes processed test data received from the SUT in real-time during testing of the SUT.

10. A system as recited in claim 9, further comprising memory that stores the encoded test data prior to testing the SUT.

11. A system as recited in claim 10, wherein the stored encoded test data is transmitted to the SUT during testing of the SUT, the SUT processing the test data and transmitting the processed test data to the system.

12. A system as recited in claim 9, wherein the encoder is executed on a computer separate from a computer executing the decoder.

13. A system as recited in claim 9, wherein the test data is speech data.

14. A system as recited in claim 13, further comprising speech quality comparison logic that analyzes the quality of the processed speech data.

15. A system as recited in claim 14, wherein the speech quality comparison logic compares the processed speech data to reference speech data to obtain speech quality result data.

16. A system as recited in claim 15, wherein the speech quality result data is stored in a quality of service (QoS) data file.

17. A computer program embodied on a computer readable medium for testing telecommunication devices, the computer program comprising:
   an encoder code segment that encodes test data prior to testing a system under test (SUT), the test data being compressed by the encoder code segment for transmission to the SUT; and a decoder code segment that decodes processed test data received from the SUT in real-time during testing of the SUT.compressed by the encoder code segment for transmission to the SUT; and 18. A computer program as recited in claim 17, wherein the test data is speech data.

19. A computer program as recited in claim 18, further comprising a code segment that stores the encoded speech data prior to testing the SUT.

20. A computer program as recited in claim 17, further comprising a code segment that compares the processed test data to reference speech data to obtain speech quality result data.

21. A computer program as recited in claim 20, further comprising a code segment that stores the speech quality result data to a quality of service (QoS) data file.

* * * * *